(12) United States Patent
Toyoda et al.

(10) Patent No.: US 6,613,225 B1
(45) Date of Patent: Sep. 2, 2003

(54) APPARATUS FOR PHOTOCATALYTIC REACTION WITH AND METHOD FOR FIXING PHOTOCATALYST

(75) Inventors: Atsushi Toyoda, Himeji (JP); Tatsuo Kanki, Himeji (JP)

(73) Assignee: Kabushiki Kaisha Himeka Engineering, Hyogo (JP)

( * ) Notice: Subject to any disclaimer, the term of this patent is extended or adjusted under 35 U.S.C. 154(b) by 0 days.

(21) Appl. No.: 09/719,135

(22) PCT Filed: Jun. 7, 1999

(86) PCT No.: PCT/JP99/03049

§ 371 (c)(1),
(2), (4) Date: Jan. 26, 2001

(87) PCT Pub. No.: WO99/64357

PCT Pub. Date: Dec. 16, 1999

(30) Foreign Application Priority Data

Jun. 12, 1998 (JP) ............................................. 10-165103

(51) Int. Cl.[7] .............................. C02F 1/30; C02F 1/48; C02F 1/72; B01J 19/12
(52) U.S. Cl. .................... 210/205; 210/198.1; 210/748; 210/763
(58) Field of Search .............................. 210/205, 198.1, 210/748, 763

(56) References Cited

U.S. PATENT DOCUMENTS 5,308,458 A * 5/1994 Urwin et al.

FOREIGN PATENT DOCUMENTS

| JP | 07-171408 | 7/1995 | ............ B01J/35/02 |
| JP | 08-318166 | 12/1996 | ............ B01J/37/02 |
| JP | 10-202257 | 8/1998 | ............ C02F/1/32 |
| JP | 10-263534 | 10/1998 | ............ C02F/1/30 |
| JP | 11-319857 | * 11/1999 | |

* cited by examiner

Primary Examiner—Thomas M. Lithgow
(74) Attorney, Agent, or Firm—Marshall, Gerstein & Borun

(57) ABSTRACT

A first object is to provide an apparatus for photocatalytic reaction with high treating efficiency and treatment ability that is not degraded with an elapse of operating time and a second object is to provide a method for simply and efficiently immobilizing a photocatalyst on a support. The first invention is to immobilize (coat) a photocatalyst on a surface of a support, continuously supply solution to be treated in atmosphere in thin film shape on the surface of the immobilized photocatalyst, and irradiate the photocatalyst surface with light for causing photocatalytic reaction to occur. A second invention is a method for immobilizing a photocatalyst on a support by using alkali metal silicate as a binding agent, comprising: a first step for coating and immobilizing an aqueous solution of the alkali metal silicate on the support; a second step for coating and immobilizing a powdered photocatalyst on the alkali metal silicate after the first step; and a third step for curing the coated and immobilized photocatalyst after the second step.

4 Claims, 9 Drawing Sheets

(a) (b)

(c)

(a)

(b)

APPARATUS FOR PHOTOCATALYTIC REACTION WITH AND METHOD FOR FIXING PHOTOCATALYST

TECHNICAL FIELD

The present invention relates to an apparatus for photocatalytic reaction for efficiently purifying organic compounds or nitrogen oxides contained in water or wastewater (solution to be treated) by utilizing a photocatalyst and a photocatalyst immobilizing method for efficiently immobilizing the photocatalyst used in the apparatus for photocatalytic reaction on a surface of a support.

BACKGROUND ART

In recent years, attention has been focused on environmental problems and emphasis has been laid on tightening of regulations of wastewater, exhaust gases and the like. As part of it, a technique for purifying the wastewater or the exhaust gases has been remarkably highlighted.

By way of examples, a variety of attempts have been made to make the wastewater or exhaust gases containing these hazardous compounds nonhazardous by so-called "photoreaction" such as photodegradation or photooxidation caused by irradiating the organic compounds or nitrogen oxides (N Ox) with light having a specific wavelength.

It is known that the photoreaction (photoreaction using the photocatalyst is referred to as "photocatalytic reaction") can efficiently occur when titanium dioxide, zirconium oxide, or the like is used as a catalyst (photocatalyst) to cause the photoreaction to occur. It is also known that familiar solar light, for example, light of a fluorescent lamp or the like can be used as light.

Specifically, a purifying method for making the hazardous compounds nonhazardous has been proposed, in which a powdered photocatalyst is put into the solution to be treated containing the hazardous compounds such as the organic compounds or the nitrogen oxides (N Ox) and suspended, and the solution to be treated, to be precise, the photocatalyst in the solution to be treated is irradiated with light.

However, this purifying method has a technical drawback, because the powdered photocatalyst is suspended in the solution to be treated after an elapse of long time, it is difficult to efficiently collect the photocatalyst after treatment.

Accordingly, to eliminate the necessity of collecting the powdered photocatalyst after photoreaction, a purifying method has been proposed, in which the powdered photocatalyst is immobilized on a support (glass plate and the like) by using a binding agent comprising organic high molecular compounds or inorganic compounds and irradiated with light from a light source placed in atmosphere with the support immersed in the solution to be treated.

However, in this purifying method, since it is difficult for the light to reach a photocatalyst surface on the support surface immersed in the water, the photocatalytic reaction is degraded and treatment efficiency is reduced. On the other hand, a method for immersing the light source as well as the photocatalyst has been proposed, to improve the photocatalytic reaction by making the light source closer to the photocatalyst. In this case, it is necessary to cover a surface of the light source with a glass pipe or the like. Hence, this method also has a technical drawback, because with an elapse of immersion time, foreign substances are gradually attached to the surface of the glass pipe, which causes the treatment ability to be degraded with an elapse of time.

By the way, when the powdered photocatalyst is immobilized on the support (glass plate or the like) by using the binding agent comprising the organic high molecular compounds, the binding agent is expensive and tends to be deteriorated by photodegradation or photooxidation. Also, the photocatalyst surface is covered with the binding agent, which causes a catalytic function to be degraded.

Accordingly, as described in Japanese laid-Open Patent Publication No. Hei. 7-126324, a method has been proposed, in which an aqueous solution in which alkali metal silicate of an inorganic compound which is less subject to photodegradation or photooxidation and the powdered photocatalyst are mixed is coated on a surface of a support such as glass (including an inner face of a container into which wastewater is put) and used as the photocatalyst.

In this case, however, the photocatalyst is covered with the alkali metal silicate acting as the binding agent, or coating becomes difficult depending on the ratio of the alkali metal silicate to the photocatalyst, which is a serious drawback.

In consideration of the above circumstances, an object of a first invention is to provide an apparatus for photocatalytic reaction that has high treatment efficiency and treatment ability that is not degraded with an elapse of operating time and an object of a second invention is to provide a method for simply and efficiently immobilizing the photocatalyst on the support.

DISCLOSURE OF THE INVENTION

To solve the above-described technical problems, an apparatus for photocatalytic reaction according to the first invention is characterized in that a drum having a photocatalyst immobilized on a surface thereof is rotated with a part of the drum immersed in a solution to be treated and a part of the drum exposed on the solution to be treated so that immersion and exposure are continuously repeated and an exposed surface of the drum is irradiated with light for causing the photocatalytic reaction to occur.

According to the apparatus for photocatalytic reaction configured described above, because the part of the drum is immersed in the solution, the solution to be treated is attached in thin film shape to the photocatalyst on the surface of the drum and irradiated with light in atmosphere outside of the solution. Therefore, the photocatalytic reaction can always occur efficiently and continuously. Also, the photocatalytic reaction can be realized with a relatively simple configuration.

An embodiment of the apparatus for photocatalytic reaction according to the first invention is that a conical plate having an increased thickness at center of rotation and a reduced thickness on an outer peripheral side thereof and having a photocatalyst-immobilized surface is rotated with a part of the conical plate immersed in the solution to be treated and a part of the conical plate exposed on the solution to be treated so that immersion and exposure are continuously repeated and an exposed surface of the conical plate is irradiated with light for causing the photocatalytic reaction to occur. With this configuration, the photocatalytic reaction can occur if the light for causing the photocatalytic reaction to occur is emitted from above.

Further, another embodiment is that a plate having a photocatalyst immobilized on a surface thereof is continuously and repeatedly immersed in the solution to be treated and exposed on the solution to be treated and an exposed plate surface is irradiated with light for causing the photocatalytic reaction to occur. In this case, a plurality of plates are placed around a rotating shaft like a water wheel to make surface areas larger.

A further embodiment is that the photocatalyst immobilized on the surface is hydrophilic. This embodiment is preferable in that the solution to be treated is reliably attached in thin film shape on the surface.

A still further embodiment is that platinum functioning as a catalyst is attached on the photocatalyst surface immobilized on the surface. Thereby, if oxygen dissolved in the solution to be treated is less, the photocatalytic reaction occurs actively and stably. When the solution to be treated is provided in thin film shape, oxygen (air) in atmosphere can be utilized and attachment of platinum is not always necessary.

To solve the above-described technical problem, a method for immobilizing a photocatalyst according to the second invention in which the photocatalyst is immobilized on a support by using alkali metal silicate as a binding agent, comprises: a first step for coating an aqueous solution of the alkali metal silicate on the support and immobilizing the aqueous solution thereon, a second step for coating a powdered photocatalyst on the alkali metal silicate and immobilizing the powdered photocatalyst thereon after the first step, and a third step for curing the coated and immobilized photocatalyst after the second step.

According to the method for immobilizing the photocatalyst having such a procedure, the powdered photocatalyst with high performance is efficiently and stably immobilized on the surface of the support. Therefore, so fabricated photocatalyst on the surface of the support is capable of making hazardous compounds nonhazardous by photoreaction for a long period of time without being dropped off or peeled off after use.

According to the method of the second invention, the photocatalyst can be coated on the surface of the support with highest efficiency in fabrication. Therefore, this can be mass-produced in a short time and at a low cost.

In an embodiment of the method for immobilizing photocatalyst according to the second invention, in practice, the aqueous solution of the alkali metal silicate used in the first step is preferably an aqueous solution having a concentration of 1 wt %–60 wt % and the photocatalyst used for coating in the second step is preferably a powdered photocatalyst or an aqueous solution having a concentration of 2 wt % or more.

In this case, the addition of the 0.02 wt %–1 wt % alkali metal silicate to the aqueous solution reduces viscosity and makes it difficult for a nozzle to be clogged when the aqueous solution is applied by spraying, which is a preferable embodiment.

Another embodiment is that immobilization in the first and second steps may be dry processes and curing in the third step may be a sintering process.

In this case, a preferred embodiment is that the support is made of a heat-resistant material, for example, glass.

Preferably, a further embodiment is that the immobilization in the first step is a dry process at a temperature within a range of an ordinary temperature to 150° C., the immobilization in the second step is a dry process at a temperature within a range of the ordinary temperature to 150° C., and the curing in the third step is a sintering process at a temperature of 200° C.–800° C.

This embodiment is preferable in that the photocatalyst can be stabilized on the surface of the support for a long period of time.

While a thickness of a photocatalytic layer formed on the support is not limited in the second invention, it is preferable that the thickness of the photocatalytic layer is approximately 0.1 $\mu$m–500 $\mu$m in terms of sufficient absorption of irradiation light.

The support may have an arbitrary configuration, including a plate, a sphere, granule, a cylinder, fibers, a woven fabric, and a non-woven fabric. The support may be generally made of a material such as plastic, glass, metal, ceramic.

When the hazardous compounds of the organic compounds or the nitrogen oxides (Nox) are degraded or photooxided by using the photocatalyst immobilized on the support according to the method described above, the solution or gas containing the hazardous compounds is contact with the photocatalytic layer under irradiation of near ultraviolet light. Preferably, the wavelength of the light is varied according to the type of the photocatalyst in terms of efficiency. For example, when the photocatalyst is titanium dioxide, near ultraviolet light including light of a wavelength of 90 nm or smaller is preferable. Therefore, preferably, a high pressure or low pressure mercury lamp, a xenon lamp, a black light, or the like is used as the light source. When the catalyst is tungsten oxide, a tungsten lamp as well as the above light sources is a preferable light source. Solar light is effective as the irradiation light. Also, a familiar light source, i.e., a fluorescent lamp may be used.

The immobilized photocatalyst according to the second invention is capable of degrading various types of hazardous compounds contained in the solution or gas and making them nonhazardous like the conventional powdered photocatalyst. For example, the photocatalyst is capable of degrading aromatic compounds such as picric acid or phenol, organic chlorine compounds, agricultural chemicals, surfactant in wastewater, and benzene, toluene, Nox in polluted air and making them nonhazardous.

BRIEF DESCRIPTION OF THE DRAWINGS

FIG. 2 is a view showing a configuration of a modification of the example shown in FIG. 1, wherein FIG. 2(a) is a plan view of the configuration and FIG. 2(b) is a side view perspectively showing the configuration;

FIG. 3 is a view showing a schematic configuration of an apparatus for photocatalytic reaction according to a second example (example 2) of the first invention, wherein FIG. 3(a) is a side view perspectively showing the configuration, FIG. 3(b) is a front view perspectively showing the apparatus of FIG. 3(a), and FIG. 3(c) is a side view showing a configuration of a modification in which light sources are placed differently from those of FIG. 3(b);

FIG. 4 is a view showing a schematic configuration of main portions of apparatuses for photocatalytic reaction according to a third example (example 3) and a fourth example (example 4), wherein FIG. 4(a) is a perspective view showing the third example (example 3) and FIG. 4(b) is a perspective view showing the fourth example (example 4);

FIG. 6 is a schematic perspective view showing a immobilization process according to the second invention, wherein FIG. 6(a) is a view showing a first step, FIG. 6(b) is a view showing a second step, and FIG. 6(c) is a view showing a third step;

BEST MODE FOR CARRYING OUT THE INVENTION

Apparatuses for photoctalytic reaction of the first invention can be configured as described in the following examples. Each of the apparatuses for photocatalytic reaction is capable of degrading hazardous compounds such as aromatic compounds such as picric acid or phenol, organic chlorine compounds, agricultural chemicals, surfactant in wastewater, and benzene, toluene, Nox and making them nonhazardous with high treatment efficiency and treatment ability that is not degraded with an elapse of operating time.

Hereinafter, examples of the apparatus for photocatalytic reaction of the first invention will be described with reference to the drawings.

Example 1

Figure 1:
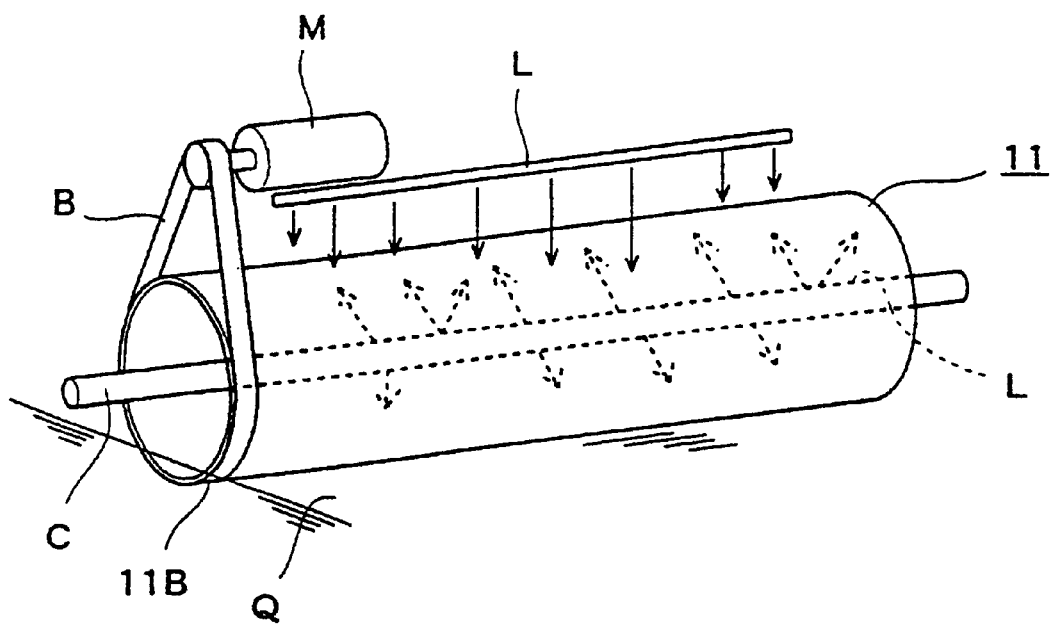
FIG. 1 is a perspective view three-dimensionally showing a schematic configuration of an apparatus for photocatalytic reaction according to a first example (example 1) of a first invention.

FIG. 1 is a perspective view showing a schematic configuration of the apparatus for photocatalytic reaction according to the first example (example 1).

In FIG. 1, reference numeral 11 denotes a cylindrical body in which photocatalyst is coated (immobilized) on surfaces (outer peripheral surface and inner peripheral surface of the cylindrical body) of a support (support made of plastic, glass, metal, ceramic, or the like). A lower end portion 11B of the lying cylindrical body 11 is immersed in a solution to be treated Q and an upper portion thereof is exposed in atmosphere. Above the cylindrical body 11 and around a rotating shaft C, a light source (lamp) L (shown as being integral with the rotating shaft C in FIG. 1) is placed. The cylindrical body 11 is adapted to be rotated around the rotating shaft C by a driving motor M provided externally so that immersion into the solution to be treated and exposure in atmosphere are continuously repeated.

The type of the light source (lamp), that is, the wavelength of the irradiation light is preferably varied according to the type of the photocatalyst in terms of efficiency. For instance, when the photocatalyst is titanium dioxide, a high pressure mercury lamp or a lower pressure mercury lamp, a xenon lamp, a black light, or the like is used, because near ultraviolet light including light of a wavelength of 390 nm or smaller is preferable. When the catalyst is tungsten oxide, a tungsten lamp as well as the light sources is a preferable light source. For an apparatus used outdoors, the solar light is effective as the light source and the fluorescent lamp is a familiar light source to be used.

As the photocatalyst, a hydrophilic photocatalyst to which platinum is attached is used.

The immobilization of the photocatalyst on the support is efficiently performed by the immobilization method of photocatalyst according to the second invention.

Further, in this example, to cause the photocatalytic reaction to occur stably and actively, the platinum is loaded on the photocatalyst on the surface by using a "photodeposition method". In a method for loading platinum, the platinum can be loaded on powders by the "photodeposition method", a "mixing method" or an "impregnation method" when an immobilized photocatalyst film is made of powders.

The apparatus for photocatalytic reaction so configured operates as follows. When the cylindrical body 11 is rotated by the driving motor M and moving upward of the lower end thereof, the solution to be treated Q is attached in thin film shape on the surfaces (outer surface and inner surface) of the cylindrical body 11. The solution to be treated attached in thin film shape is irradiated with light from the light source L placed above and around the rotating shaft C in atmosphere. In consequence, the photocatalytic reaction occurs on the surface of the cylindrical body 11 and the hazardous compounds in the solution to be treated is treated and purified. In this example, the solution to be treated is attached in thin film shape on the surface of the cylindrical body 11 coated with the photocatalyst and irradiated with light passing through atmosphere, causing the photocatalytic reaction to occur with highest efficiency. In particular, since the solution to be treated is attached in thin film shape on the surface of the cylindrical body 11 coated with the photocatalyst, moved upward to be exposed in atmosphere and irradiated with light passing through atmosphere and platinum is attached to the photoctalytic, the photocatalytic reaction occurs with highest efficiency. In addition, since the photocatalyst surface is hydrophilic, the solution to be treated is quickly and stably spread and attached in thin film shape on the photocatalyst surface as described above, which contributes to acceleration of the photocatalytic reaction.

In case of the apparatus for photocatalytic reaction so configured, since the photocatalytic reaction occurs on the outer surface and the inner surface of the cylindrical body, the treatment efficiency is high. Further, since movable portions are the driving motor M for rotating the cylindrical body 11 and a belt B, a highly reliable and inexpensive apparatus is obtained.

Figure 2:
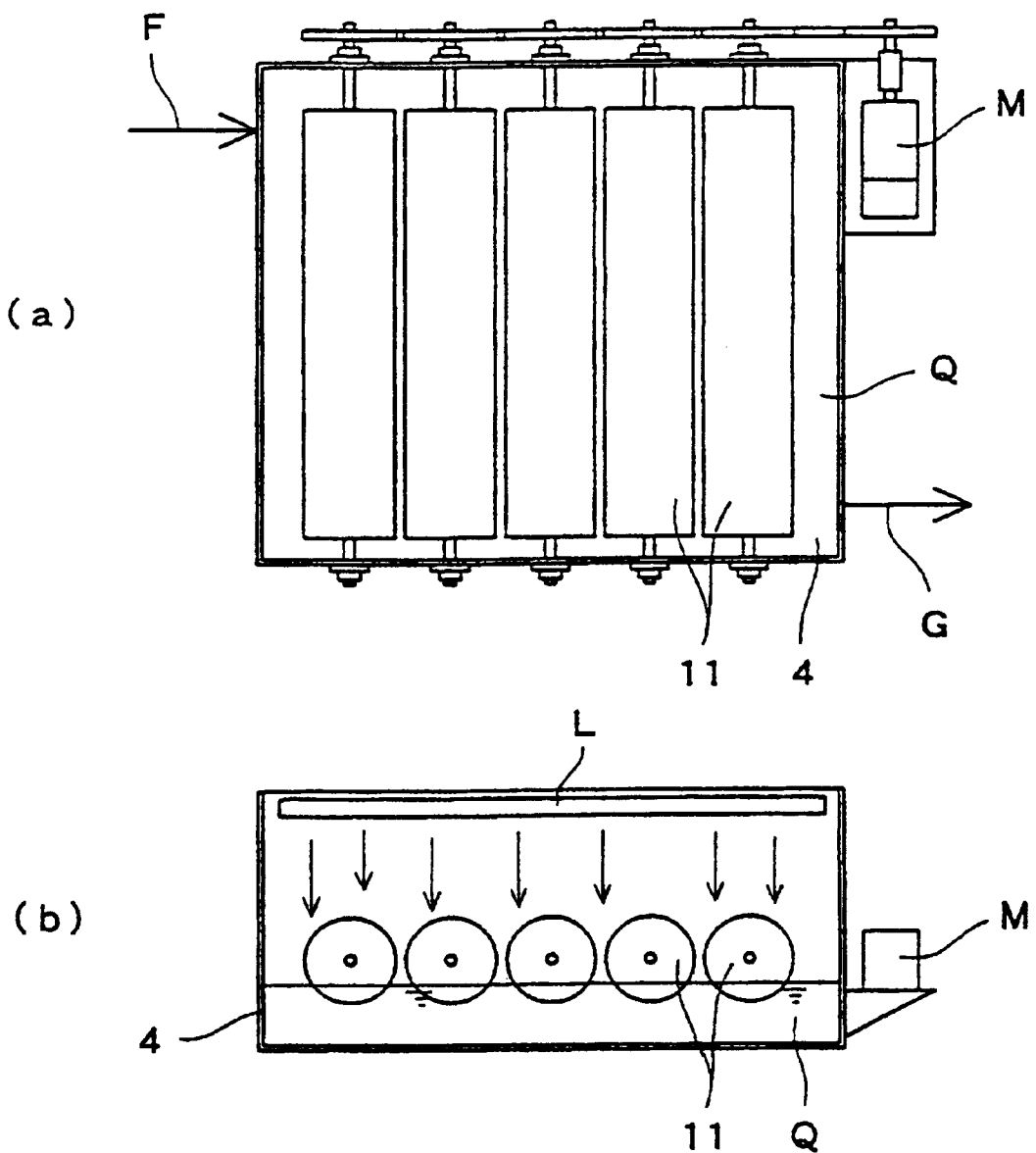

As shown in FIGS. 2(a) and 2(b), as a modification example (example of the apparatus for photocatalytic reaction of a practical type) of the first example 1, a number of cylindrical bodies 11 are arranged in a bath 4 that contains the solution to be treated Q, and these plural cylindrical bodies 11 are rotated by the driving motor M, thereby obtaining the overall high treatment efficiency. Also, in this case, the light L is placed above the plural cylindrical bodies 11. In FIG. 2(a), an arrow F indicates inflow of the solution to be treated Q into the bath 4 and an arrow G indicates outflow of the treated solution Q from the bath 4.

While the photocatalyst is coated on the outer surface and the inner surface of the cylindrical body 11 in the above example, it may be alternatively coated only on the outer surface of the cylindrical body. In this case, advantageously, the configuration can be simplified.

Example 2

Figure 3:
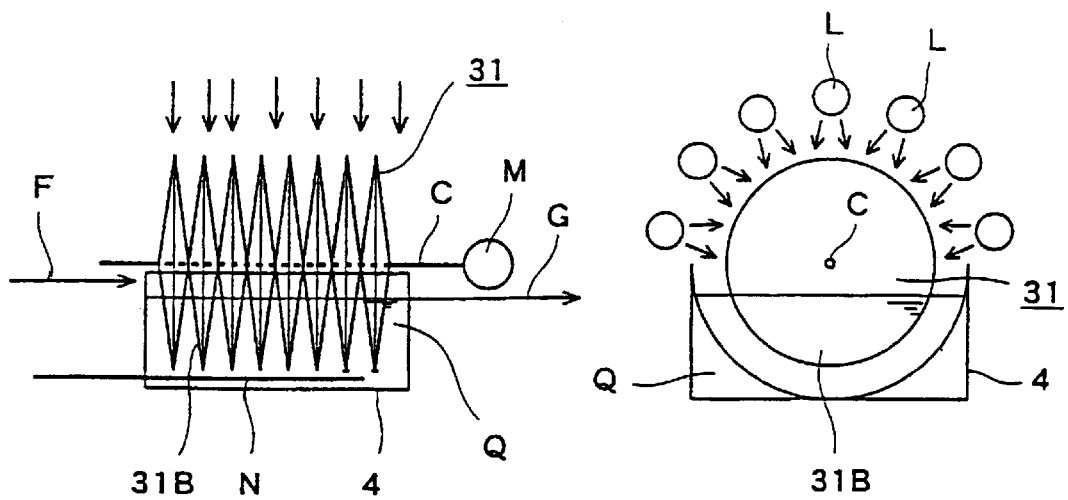
Figure 3:
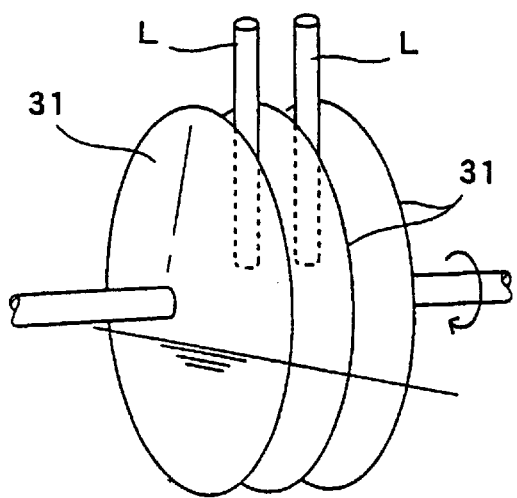

FIGS. 3(a) and 3(b) are views showing a schematic configuration of an apparatus for photocatalytic reaction of a second example (example 2) according to the first invention. In FIGS. 3(a) and 3(b), reference numeral 31 denotes conical plates in which surfaces (both surfaces or an outer peripheral surface of a circular plate) of supports (supports made of plastic, glass, metal, ceramic, and the like) are coated with photocatalyst (photocatalyst is immobilized on the surfaces). Lower end portions 31B of the conical plates 31 are immersed in the solution to be treated Q and upper portions thereof are exposed in atmosphere. As shown in FIG. 3(b), light sources (lamps)L are placed above the conical plates 31. The conical plates 31 are adapted to be rotated around the rotating shaft C by the driving motor M provided externally so that immersion into the solution to be treated and exposure in atmosphere are continuously performed.

As for the type of the light sources (lamps), the light sources similar to that of the "example 1" can be used, including solar light.

As the photocatalyst, the hydrophilic photocatalyst to which platinum is attached is used like the first example.

The apparatus for photocatalytic reaction so configured operates as follows. Specifically, the rotation of the conical plates 31 by the driving motor M causes the conical plates 31 to pass through the solution to be treated Q, thereby allowing the solution to be treated Q to be attached in thin film shape on the surfaces thereof, and the surfaces of the conical plate 31 having the solution to be treated Q attached in thin film shape are rotated and moved upward. In this state, that is, in atmosphere, the light is emitted from the light sources L provided above. In consequence, the photocatalytic reaction occurs on the surfaces of the conical plates 3, and the hazardous compounds in the solution to be treated are thereby treated and purified. Also in this example, the solution to be treated is attached in thin film shape on the surfaces of the conical plates 31 coated with the photocatalyst, and irradiated with the light passing through the atmosphere. Therefore, the photocatalytic reaction occurs with highest efficiency.

The apparatus for photocatalytic reaction so configured is highly reliable and inexpensive, because in addition to the high treatment efficiency, the movable portion is only the driving motor M for rotating the conical plates 31.

In FIG. 3(a), an arrow F indicates inflow into the bath 4 of the solution to be treated and an arrow G indicates outflow of the treated solution out of the bath 4. Thus, using the conical plates 31 having the photocatalyst-coated surfaces, irradiation efficiency of the light from above is increased and surface areas irradiated with light are increased, which is an advantageous example.

To improve the irradiation efficiency, as shown in FIG. 3(c), the light source L may be placed between the conical plates 31. In this case, the light sources L provided above may be left or removed.

Example 3

Figure 4:
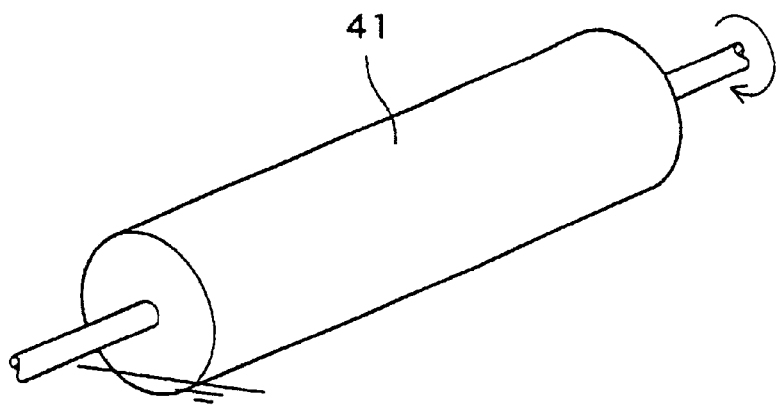
Figure 4:
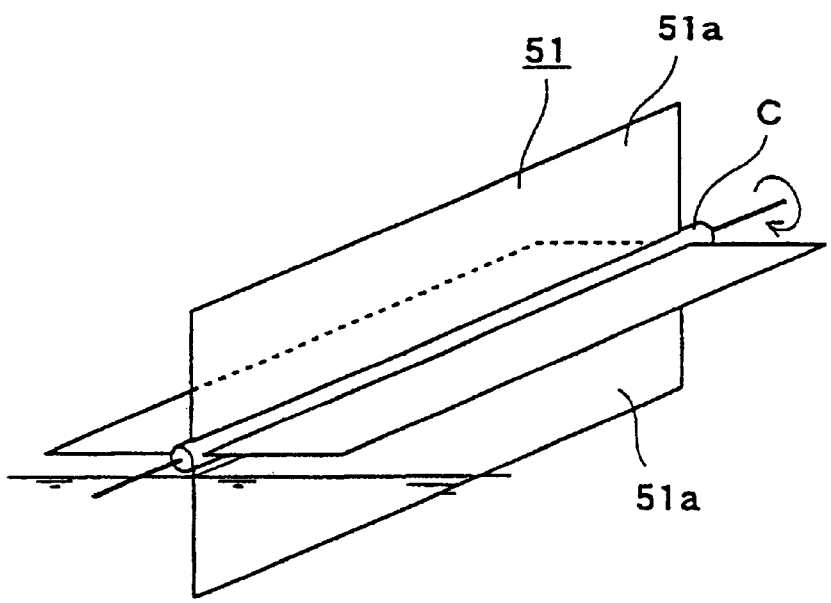

The cylindrical body 11 and the conical plates 31 may be replaced by a drum (both ends of a cylindrical body are closed by end plates) in which a support surface is coated with photocatalyst, which is placed such that it is rotatable by a driving motor as shown in FIG. 4(a). Also, as shown in FIG. 4(b), a so-called water wheel shaped body 51 in which supports having photocatalyst-coated surfaces are placed around a rotating shaft C may be used. While in configuration of the water wheel shaped body 51, four plates 51a are provided in normal line directions and portions thereof connected to a rotating shaft C are provided along the rotating shaft C, the plates 51a may be provided in spiral. The water wheel shaped body 51 is an economical and energy-free apparatus for photocatalytic reaction that can cause the photocatalytic reaction to occur using the solar light as the light source only by placement in this example, with an advantageous configuration under the condition in which the water wheel shaped body 51 can be placed in a water way like a past water wheel so that a lower end thereof is immersed in flowing water as the solution to be treated.

While water power generated by the water wheel is utilized here, it is needless to say that the apparatus may be configured such that a circular plate, a drum or the like is rotated by utilizing wind power to cause the photocatalytic reaction to occur. In each of the examples shown in FIG. 4, the support may be made of the same material described in the above examples. Also, a number of light sources can be provided either above or on both sides, both above and on the sides, or from above to the sides.

Figure 5:
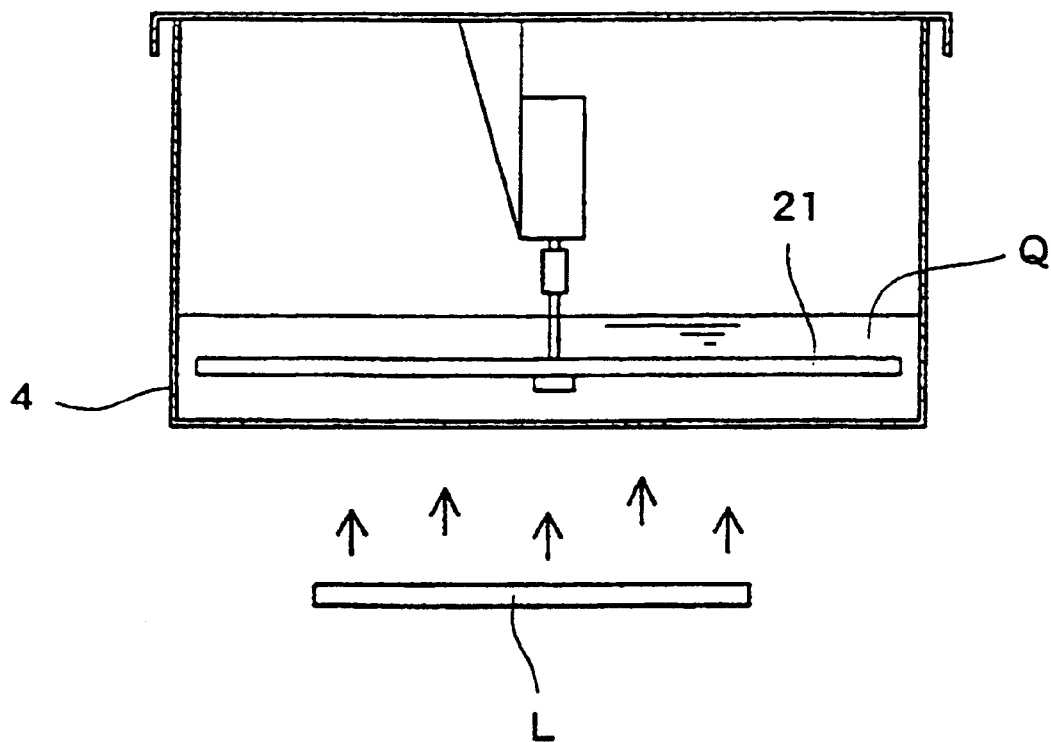
FIG. 5 is a side cross-sectional view showing an apparatus for photocatalytic reaction comprising another configuration, the functions and effects of which are compared with those of the apparatus for photocatalytic reaction according to the examples of the first invention.

By the way, for filing the application, the applicant experimentally manufactured an apparatus for photocatalytic reaction configured such that one of the conical plates 31 in which surfaces of glass supports having a diameter of 120 mm were coated with Anatase-type titanium dioxide, which were similar to the "example 2" shown in FIGS. 3(a) and 3(b), was rotated around a rotating shaft. With an approximately 40% lower portion of the conical plate 31 immersed in the solution to be treated, the plate 31 is rotated at a rotating speed of 18 rpm and irradiated with light from the 100 w high pressure mercury lamp from a position 20 cm horizontally distant from the conical plate 31. It was confirmed that a value of TOC in the solution to be treated containing acetic acid of 75 ppm by TOC was reduced by about 25% in 3 hours. On the other hand, as shown in FIG. 5, the entire circular plate 21 was immersed in the solution to be treated Q in a transparent container (bath) 4, rotated at the same rotating speed, and irradiated with light from the 100 w high pressure mercury lamp L from a position of 20 cm distant from a bottom thereof. It was confirmed that the value of TOC in the solution to be treated was reduced by only about 7% in 3 hours. In other words, it was confirmed that when the solution to be treated was attached in thin film shape on the photocatalyst surface and irradiated with the light in atmosphere like the first invention, treatment could be carried out with 3 times or more efficiency.

Figure 8:
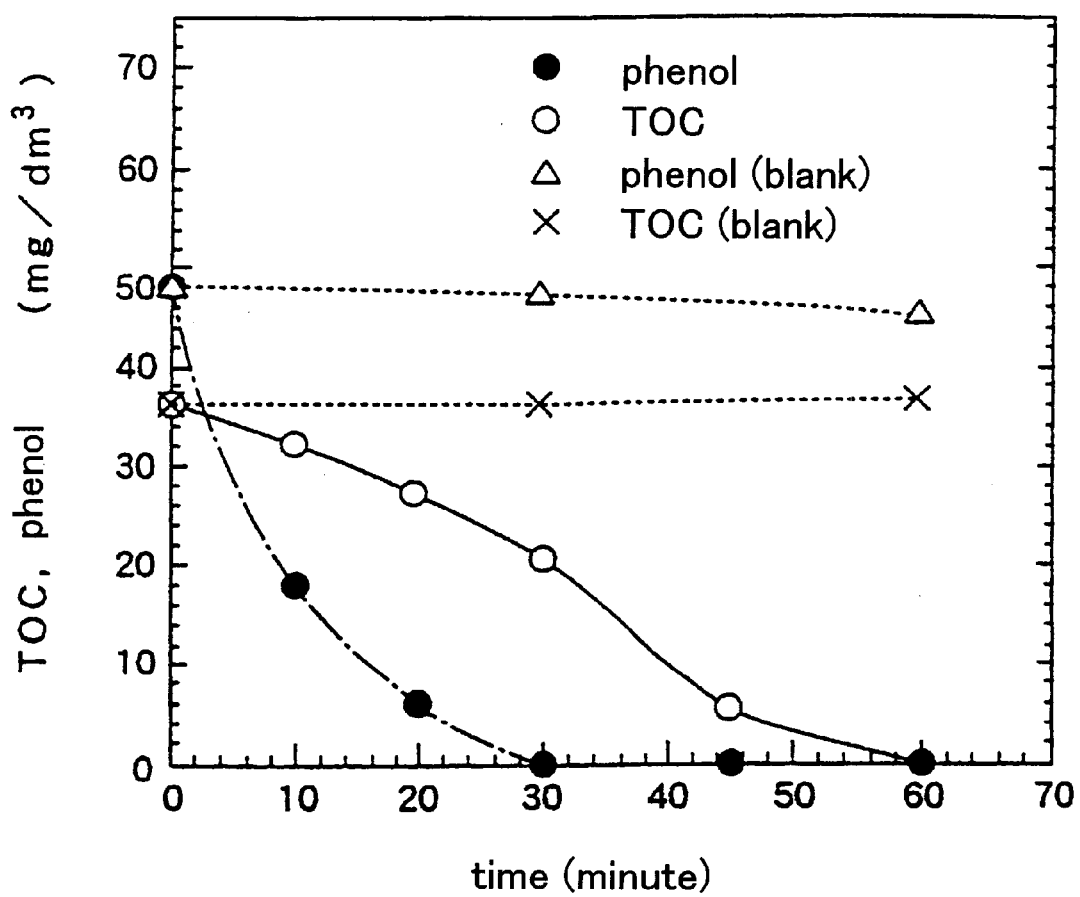
FIG. 8 is a view showing treatment states of phenol and TOC with concentrations of compounds to be treated (phenol and TOC) on a longitudinal axis and time (unit: minute) on a lateral axis.
Figure 9:
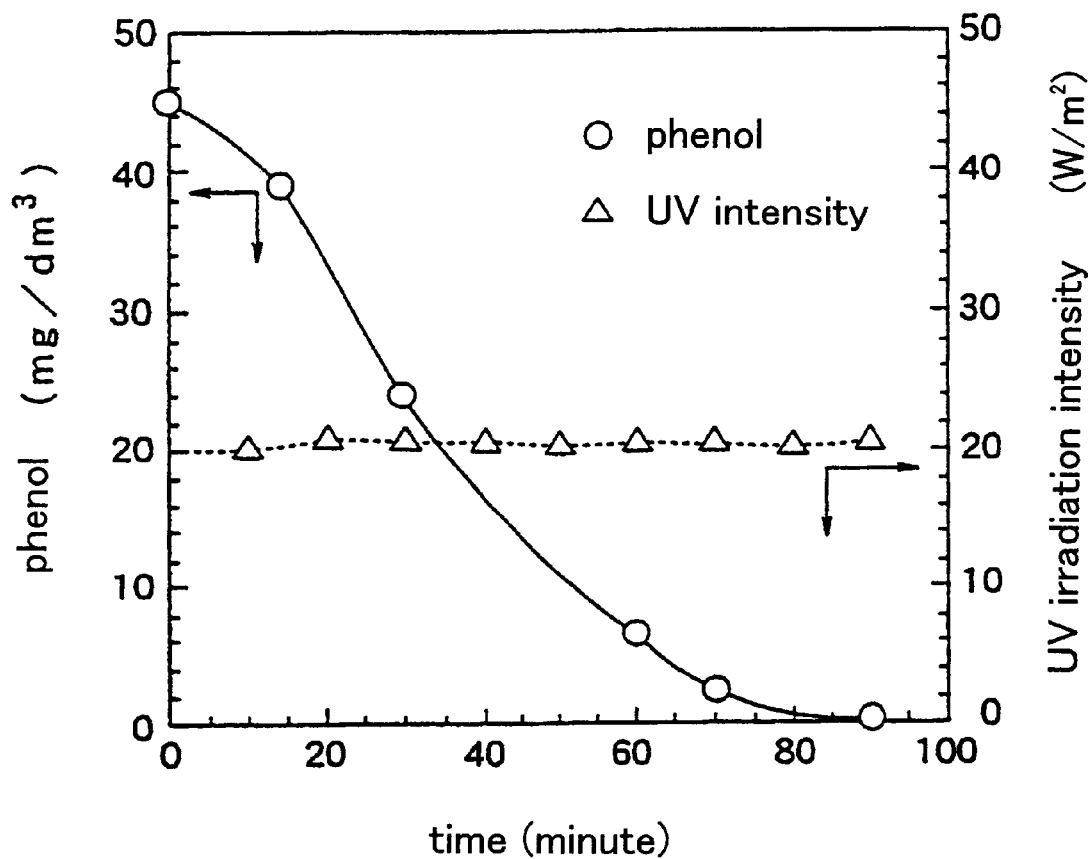
FIG. 9 is a view showing a treatment state of phenol with a concentration of a compound to be treated (phenol) and intensity of ultraviolet light of solar light (UV: UV of UV band of 280 nm–395 nm) on a longitudinal axis and time (unit: minute) on a lateral axis.

Further, prior to the present application, in the apparatus using one cylindrical body 41 shown in FIG. 4(a), two 6 W ultraviolet lamps (UV lamps) were provided on opposite sides above the cylindrical body 41 and treatment ability of the photocatalytic reaction was tested again. The result was as follows. Specifically, the cylindrical body 41 was rotated at a rotating speed of 25 rpm under the irradiation by the ultraviolet lamps. As shown in FIG. 8 with concentrations of the compounds to be treated (phenol and TOC) on a longitudinal axis and time (minute) on a lateral axis, the phenol of a concentration of approximately 50 ppm was completely degraded in about 30 minutes and the TOC of a concentration of approximately 40 ppm was completely degraded in about 60 minutes. As indicated by dotted lines, in case of a cylindrical body ("blank" cylindrical body) whose surface was not coated with the photocatalyst, it was found that the phenol and the TOC were not degraded at all. FIG. 9 shows a variation of intensity of ultraviolet light of solar light along with a variation of a concentration of phenol with an elapse of time when using the solar light as the light source. Under the condition in which the ultraviolet light transitioned before and after 20W/m$^2$, phenol of a concentration of approximately 45 ppm was degraded completely in about 90 minutes.

When platinum is not attached to the photocatalyst in any of the above examples, as shown in FIG. 3(a), it is preferable that a pipe N for supplying air into the bath 4 is provided and oxygen (O2) is supplied to the photocatalyst reduced by photocatalytic reaction through the solution to be treated Q, because the photocatalytic reaction efficiently occurs.

While specific shapes (configurations) of the photocatalyst-coated support surfaces are described in the above examples as described above, the shapes (configurations) are not limited to the above. For example, the "plate" of the example 1 may be replaced by a plate having convex and concave portions formed on a surface thereof, a plate having a porous surface, or a plate having a honeycomb structure. In such cases, contact areas are increased and treatment ability is increased. As the plate, an entirely curved plate may be used to improve light collecting efficiency. As the support, thin fibrous supports may be used in such a way that these fibrous supports are extended like so-called a "rope shop curtain" in which they are hung in branch shape. In this case, because wider contact areas are obtained as compared with a case using flat plates, the treatment ability can be improved. Also, the photocatalyst-coated support to be rotated is not limited to the circular plate, the cylindrical body, the drum, and the like, and another shapes (configurations) may be adopted.

Thus, a variety of modifications can be made within a scope of an unchanged basic technical concept of the first invention. Therefore, the first invention described above is not limited to the above examples.

Subsequently, an example of a method for immobilizing photocatalyst according to the second invention will be described.

Example 1

Figure 6:
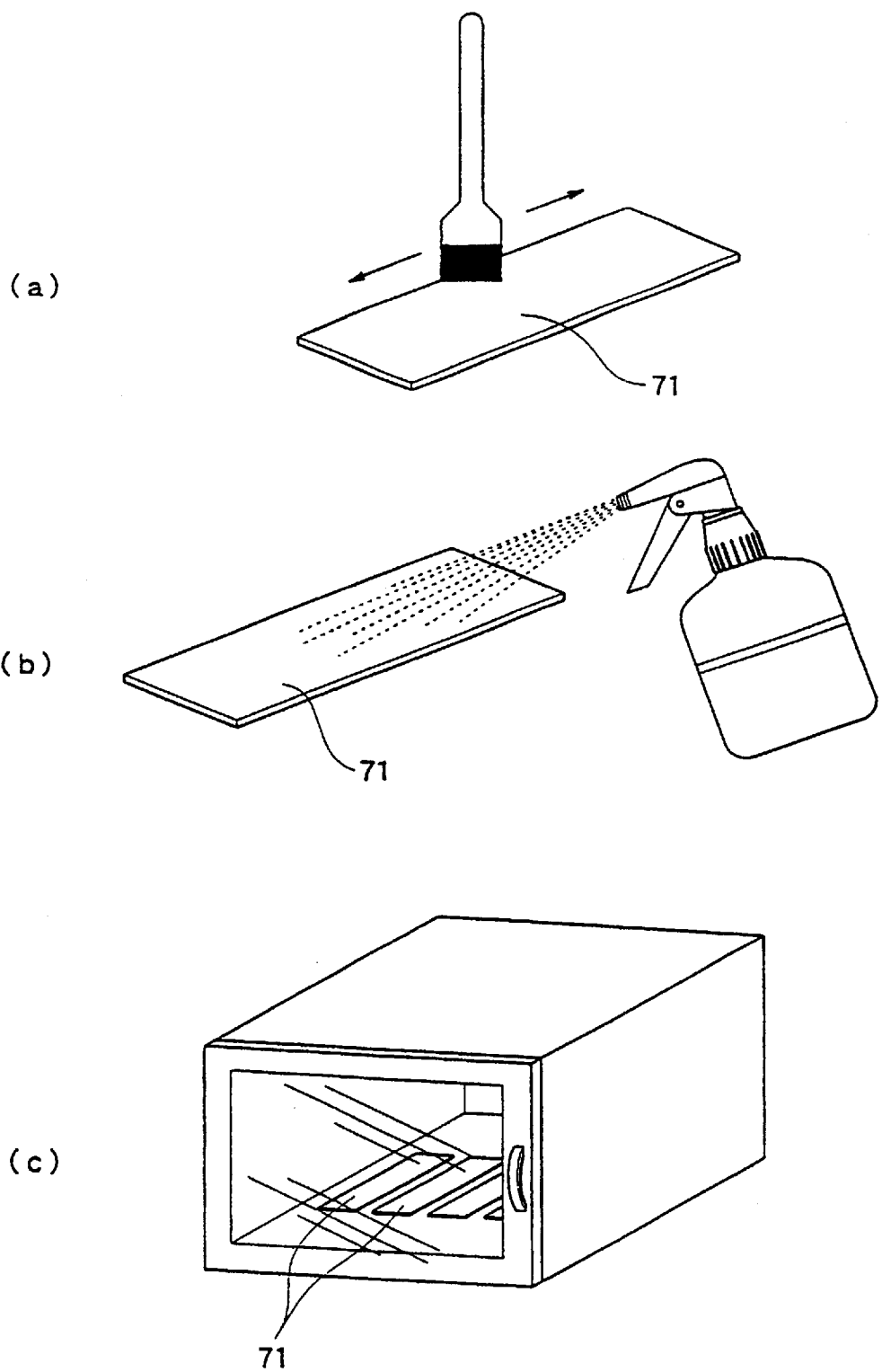

To a commercially available water glass containing 52 wt %–57 wt % sodium silicate, purified water of double amount was added to obtain an averaged solution. As shown in FIG. 6(a) or 6(b), this aqueous solution was uniformly applied (coated) on a glass plate 71 having an area of (10 mm×40 mm) and a thickness of 2 mm by a brush or by spraying and dried in a dry space at an ambient temperature of 90° C. for about 40 minutes (first step).

Subsequently, to "Anatase-type titanium dioxide TP-2 made by Fuji Titanium Ltd." of 2 g, purified water of 6 g was added to obtain an averaged solution. As shown in FIG. 6(a) or 6(b), this aqueous solution was uniformly applied (coated) on a sodium silicate layer immobilized on the surface of the glass plate 71 by the brush or spraying and dried in a dry space at an ambient temperature of 120° C. for about 3 hours (second step). In this case, when the aqueous solution is applied by spraying, the addition of approximately 0.02 wt %–1 wt % alkali metal silicate to the aqueous solution reduces viscosity of the aqueous solution and makes it difficult for the spray nozzle to be clogged. Thereafter, as shown in FIG. 6(c), the plate was sintered in an electric furnace at an ambient temperature of 400° C. for about 1 hour (third step).

Figure 7:
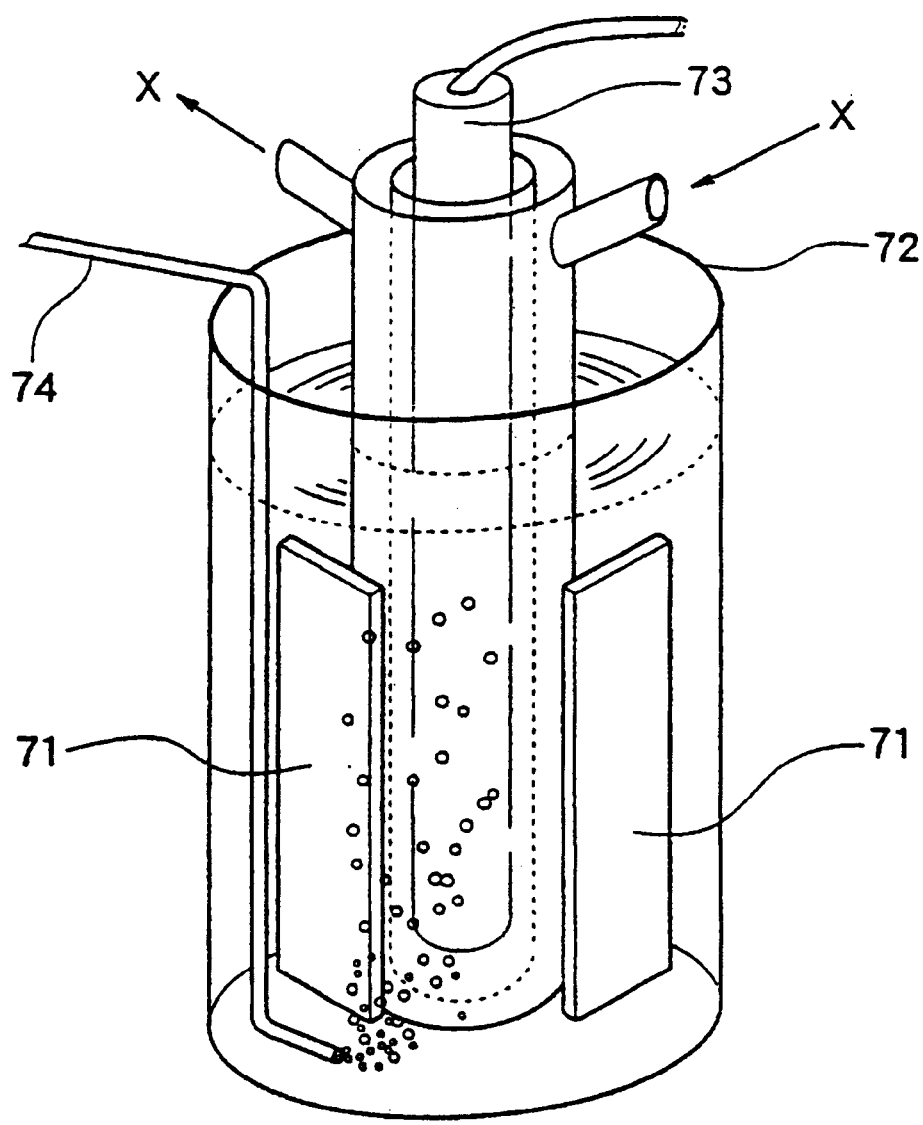
FIG. 7 is a schematic view showing an experimental apparatus used for degrading hazardous compounds by using the photocatalyst fabricated by the method shown in FIG. 6.

Four glass plates 71 having so formed titanium dioxide catalyst layers on surfaces thereof were fabricated as mentioned above and put into a pyrex glass cylindrical cell 72 of 400 cc as shown in FIG. 7. The aqueous solution containing acetic acid of 60 ppm by TOC ("total organic carbon(used as an organic compound index in analysis of water quality)") was added (supplied) into the cell and light of the 100 W high pressure mercury lamp 73 was emitted from inside of the cell while air is blown thereinto through a supply pipe 74. In consequence, after irradiation for 5 hours, the TOC of the aqueous solution containing the acetic acid was reduced by 90%. As indicated by an arrow X, cooling water was supplied around the mercury lamp 73 to cool water.

This irradiation experiment was repeated ten times for the glass plates 71, from which the catalyst layer was not peeled off at all.

Example 2

In this example, the dry temperature of the first step of the example 1 was set at 50° C. and the dry time of the first step of the example 1 was set to about 1 hour. The aqueous solution in which the powdered pohotocatalyst was dissolved into a boracic acid saturated solution was uniformly applied (coated) on the surface of sodium silicate layer and dried in a dry space at an ambient temperature of 120° C. for about 2 hours (second step) like the example 1. Thereafter, the plate was sintered in the electric furnace at an ambient temperature of 400° C. for about 1 hour (third step). In other respects, the same conditions as the example 1 were used.

Four glass plates 71 having so formed titanium dioxide catalyst layer on surfaces thereof were fabricated and put into the pyrex glass cylindrical cell 72 of 400 cc. The aqueous solution containing acetic acid of 1000 ppm by TOC was added into the cell and light of the 100 W high pressure mercury lamp is emitted from inside of the cell while air is blown thereinto. In consequence, after irradiation for 3 hours, the TOC of the aqueous solution containing the acetic acid was reduced by 30%.

After this irradiation experiment, solid substances dropped off or peeled off were not found in the aqueous solution in the cell or washing solution of the glass plate 71.

Example 3

To a commercially available water glass containing 52 wt %–57 wt % sodium silicate, purified water of triple amount was added to obtain an averaged solution. This aqueous solution was uniformly applied (coated) on a glass plate 71 having an area of (10 mm×40 mm) and a thickness of 2 mm like the example 1 and air-dried at a room temperature (20° C.) for about 40 minutes (first step).

Subsequently, the averaged aqueous solution comprising "Anatase-type titanium dioxide TP-2 made by Fuji Titunium Ltd. " and purified water was uniformly applied (coated) on the surface of the sodium silicate layer on the surface of the glass plate 71 and dried in the dry space at the ambient temperature of 120° C. for about 3 hours (second step). Thereafter, the plate was sintered in the electric furnace at an ambient temperature of 400° C. for about 1 hour (third step).

Like the example 1, glass plates 71 having so formed titanium dioxide catalyst layer on surfaces thereof were put into the cell of 400 cc, the aqueous solution containing acetic acid of 60 ppm by TOC was added into the cell, and light of the 100 W high pressure mercury lamp was emitted from inside of the cell while air was blown thereinto. In consequence, after irradiation for 5 hours, the TOC of the aqueous solution containing the acetic acid was reduced by 60%. The irradiation experiment was repeated three times for the glass plates, from which the catalytic layer was not peeled off at all.

Example 4

To a commercially available water glass, purified water of triple amount was added to obtain an averaged solution. This aqueous solution was uniformly applied (coated) on the glass plate 71 having an area of (10 mm×40 mm) and a thickness of 2 mm like the example 1 and dried at a room temperature (about 20° C.) for about 40 minutes (first step).

Subsequently, the aqueous solution in which the powdered photocatalyst was dissolved into the boracic acid saturated solution was uniformly applied (coated) on the surface of the sodium silicate like the example 1 and dried at a room temperature (about 20° C.) for about 5 hours (second step). The plate was immersed in the boracic acid saturated solution for 10 hours and dried at a room temperature to be cured, thereby fabricating the glass plate 71 having the titanium oxide catalytic layer (third step).

The glass plates 71 having so formed titanium oxide catalyst layers on the surfaces thereof were put into the cell of 400 cc like the example 1, the aqueous solution containing acetic acid of 100 ppm by TOC was added into the cell, and light of the 100 W high pressure mercury lamp was emitted from the inside of the cell while air was blown thereinto. In consequence, after irradiation for 8 hours, the TOC of the aqueous solution containing the acetic acid was reduced by 70%.

This irradiation experiment was repeated twice for the glass plates 71, from which the catalytic layer was not peeled off at all.

While the glass plate 71 is used as the support in the above examples, glass of another shapes (for example cylindrical glass) may be used. Alternatively, a plastic support, or a fibrous support may be used.

The second invention was not limited to the above examples and a variety of configurations may be implemented without departing from the technical concept of the second invention.

According to the understanding of the inventor, the sintering temperature of the third step can be within the range of 200° C.–800° C. according to the material or the like of the support.

INDUSTRIAL APPLICABILITY

The apparatus for photocatalytic reaction according to the first invention is an apparatus for photocatalytic apparatus with revolutionarily high efficiency and treatment ability that is not degraded with an elapse of operating time as compared to the conventional apparatus for photocatalytic reaction. Besides, in configuration, the apparatus is simple, highly reliable, and relatively inexpensive.

In particular, in case of the apparatus for photocatalytic reaction of the example shown in FIG. 4(b), only by placing the water wheel shaped body in an agricultural water way such that its lower end portion is immersed in flowing water, the hazardous compounds such as agricultural chemicals used in rice paddies can be degraded by using solar light and discharged to downstream. Therefore, this is an environmentally friendly apparatus for photocatalytic reaction.

According to the method for immobilizing the photocatalyst according to the second invention, the high-performance powdered photocatalyst immobilized on the support is obtained. Besides, the photocatalyst is capable of stably degrading hazardous compounds for a long period of time.

Accordingly, when using or clearing the support having photocatalyst-immobilized surface, the photocatalyst is not peeled off the support and, therefore, contributes to degradation of the hazardous compounds in the wastewater or polluted air and making them nonhazardous in an automatic apparatus using the photocatalyst.

What is claimed is:

1. An apparatus for photocatalytic reaction comprising a drum having a photocatalyst immobilized on a surface thereof, wherein the drum is rotated with a part thereof immersed in a solution to be treated and a part thereof exposed on the solution to be treated so that immersion and exposure are continuously repeated and an exposed surface of the drum is irradiated with light for causing the photocatalytic reaction to occur.

2. An apparatus for photocatalytic reaction comprising a conical plate having a photocatalyst immobilized on a surface thereof and having an increased thickness at center of rotation and a reduced thickness on an outer peripheral side thereof, wherein the conical plate is rotated with a part thereof immersed in a solution to be treated and a part thereof exposed on the solution to be treated so that immersion and exposure are continuously repeated and an exposed surface of the plate is irradiated with light for causing photocatalytic reaction to occur.

3. The apparatus for photocatalytic reaction according to any of claims 1–2, wherein platinum functioning as a catalyst is preattached on a surface of the photocatalyst immobilized on the surface.

4. The apparatus for photocatalytic reaction according to any of claims 1–2, wherein the photocatalyst immobilized on the surface is hydrophilic.

* * * * *